3,198,758
INORGANIC CEMENT-EPOXY RESIN COMPOSITION CONTAINING ANIMAL GLUE
James Howard Donnelly, 148 Laidley St., San Francisco, Calif.
No Drawing. Filed Dec. 5, 1961, Ser. No. 157,250
8 Claims. (Cl. 260—6)

This invention relates to inorganic cement-epoxy resin compositions for use in the construction, coating, or resurfacing of building units, highways, air strips, water conduits, flumes, bridges, metal and wooden piling, metal and concrete pipes, industrial tanks and vessels, and like installations.

Although the herein described compositions may be applied by use of molding, casting, troweling or spinning techniques, they are particularly well suited for use as spray coating compositions.

It is well known, of course, to spray coat various types of surfaces with various cement compositions. However, the use of such compositions is limited by the fact that the sand and cement components thereof conventionally are pumped dry to the gun. This results in non-uniform mixing with consequent formation of sand pockets in the applied coating. Also, since the conventional compositions have poor cohesion, their application is attended by excessive rebound. Since they possess a minimum of adhesion, they will not bond satisfactorily to many surfaces and consequently spall and fall off after application. Still further, they are subject to deterioration by changing weather conditions (freeze-thaw), and subject to attack by chemical agents.

When it is attempted to spray or "gun on" premixed, wet cement compositions, it is necessary to include in the compositions a large amount of water, air entrainment agents, and materials such as asbestos in order to make them pumpable. These wet compositions also demonstrate relatively poor cohesive qualities and hence are characterized by excessive rebound. In addition, their bond to the substrate is poor and after application they exhibit both maximum shrinkage and very low strength.

Likewise it is known to coat various surfaces with epoxy compositions such as those containing epoxy resin and sand, or epoxy resin and aggregate. However, such compositions often are difficult to apply on floors, vertical walls and ceilings. They must be applied in multi-coat applications to attain the desired thickness. They can be made only in small quantities (5 gallons maximum) because of their limited pot life or working life. When applied to walls or ceilings, they have very poor thixotropic or hanging properties. Also, they are very expensive.

It is the essence of the present invention that the foregoing deficiencies of the prior art compositions can be overcome by combining an inorganic cement and thermosetting epoxy resin in the proportions and manner stipulated herein to form compositions which are widely applicable as construction materials per se, or as coatings varying from a fraction of an inch up to several inches in thickness and applicable to a wide variety of surfaces.

In formulating and applying such compositions, advantage is taken of the fact that the reactions occurring during the setting of the inorganic cement are exothermic. The heat thus liberated is employed to assist in the setting of the epoxy resin, which is expedited by the application of heat. However, the setting reaction is modified by taking advantage of the presence of the water employed with the cement to set it. As a result, it becomes possible to employ inorganic cement-epoxy resin compositions in a wide variety of applications and with manifold and significant advantages, as follows:

First, they are applicable as coatings over a wide diversity of surfaces including wood, plywood, metal, masonry, plaster, stucco and either green or cured concrete.

Second, the strength of the bond between the inorganic cement-epoxy coating and the underlying surface is extremely strong.

Third, the inorganic cement-epoxy resin compositions provide surfaces which are highly resistant to the action of alkalies, acids, and other chemical reagents, as well as to atomspheric agents and agents of physical degeneration. This is of great importance in applications such as tanks, pipes, tank linings, pipe linings, flumes, floors and piling where the applied composition is subjected to the action of chemical agents. It also is of importance when the applications are used for the resurfacing of air strips (for jet fuel resistance); for the resurfacing of highways (for resistance to gasoline, oil, de-icing chemicals, spalling, and freeze-thaw-action); and for building reservoirs, dams, drydocks, flumes and other structures (for imparting resistance to weathering and physical deterioration).

Fourth, the epoxy resin acts as a highly efficient air entrainment agent with the result that there may be prepared cured compositions having a controlled amount of entrained air in the form of small, uniformly dispersed bubbles of controlled size. These are surrounded by shells of the inorganic cement-epoxy resin mixture. They assist greatly in applying the uncured compositions where they serve in effect as lubricating agents making it possible to pump, spray, gun-on, cast, pour, spin, rod, float, trowel and finish the compositions at a substantial saving over conventional concrete, stucco, mortar, or plaster. In addition, the strong, uniformly dispersed bubbles impart to the compositions maximum workability plus maximum strength for given weight.

Fifth, the inorganic cement-epoxy resin uncured compositions exhibit very superior cohesive and adhesive qualities. In other words, they do not bleed, but remain plastic over long periods of time. Hence, they pump easily when being sprayed premixed wet, or when applied at the nozzle in a dry gunite mix. In addition, they work easily when being troweled, rodded, floated, and finished. Still further, rebound losses during wet or dry spraying are greatly reduced, thus saving in labor and materials.

Sixth, it is possible to transport the compositions in bulk from the site of mixing to the site of application without the hazard of premature setting in concrete trunk transit mixers.

Seventh, the finished articles made from the inorganic cement-epoxy resin compositions of my invention possess great dimensional stability, strength, and adhesion. During hardening they demonstrate substantially less shrinkage than do conventional concrete and mortar. In addition, they are more flexible, stronger, and bond better to reinforcing metal with which they may be used, as well as to concrete and masonry surfaces to which they are applied. They also show higher compressive strength with age.

Eighth, the herein described inorganic cement-epoxy resin compositions enable metal reinforcing and metal surfaces with which they are in contact to resist corrosion.

Ninth, since the epoxy resins cure in alkaline environments, the inorganic cement-epoxy resin compositions of the present invention not only tolerate the inclusion of the so-called "high alkali" cements but even use them to advantage, the epoxy resin apparently tying up the alkali and preventing alkali-induced deterioration of the cured cement article during its use. This in effect makes possible the advantageous application of the high alkali ments, which are available at substantially reduced cost to the cement manufacturer, and which heretofore have not been usable in many structural applications.

Generally indicated, the constitutents of the compositions of my invention are given below.

| | |
|---|---|
| Uncured inorganic cement, concrete aggregate | Structural proportions. |
| Thermosetting epoxy resin and curing agent therefor | 0.1–300%, based on the combined dry weight of the cement and aggregate. |
| Aqueous liquid | Quantity sufficient to hydrate the cement, lubricate the composition and disperse the epoxy resin and curing agent. |

The cements employed in the compositions of my invention comprise in general the water-settable cements such as gypsum cement, the fast and slow setting modified gypsum cements, the high-alumina cements (e.g. "Lumnite" cement), Portland cement, Portland pozzolan cement, the various fast and slow setting types of the high alumina and Portland pozzolan cements, quick-lime, and lime-pozzolan cements. The hydrating reactions occurring during the setting of these cements are exothermic in character and hence supply the heat required for setting the epoxy resin.

As has been indicated above, it is a particular feature of the invention that high alkali cements may be employed together with the other constituents of the composition. The term "high alkali" cement, as used herein, means a Portland cement containing from 0.6–2.5% by weight of sodium and potassium alkaline salts, expressed as $Na_2O$, as determined by the procedure of ASTM Standard C114–58T.

When the high alkali cements are used in the presently described compositions there still are produced structural products which are useful and which do not demonstrate in fatal degree the deterioration normally evidenced by concrete structures made from high alkali cements. By an unknown mechanism the epoxy resin, when used with the high alkali cement, inhibits in substantial measure, or even totally, the fine cracking, spalling, and similar effects customarily characterizing the application of the high alkali cements. In addition, as also has been pointed out, the alkaline medium furnished by the cement is favorable to the setting of the epoxy resin.

As a consequence, these cements now may be employed in structural applications to which they formerly were not suited. This obviously is of the greatest importance, since their availability is great and the extra cost to the manufacturer of producing low alkali cements is from 20 to 50 cents per barrel. Hence a very substantial saving is gained.

A wide variety of concrete aggregates may be used together with the cement. Suitable aggregates may include, but are not limited to, sand, gravel, crushed rock, slag, volcanic ash, exploded shale, clays, exploded clays, pearlite, vermiculite, pumice, cinders, wood pulp, wood chips, wood shavings, sawdust, cork, emery, trap rock, glass beads, ground glass, and pieces of foamed phenolic resin, foamed polyester resin, and other foamed resins. Even the so-called "reactive" aggregates, as determined by the method of ASTM specification C227–58T, may be used with the herein described compositions which include high alkali cements. In this case, the epoxy resin content of the composition substantially reduces the deleterious reaction normally occurring between the alkali content of the cement and the reactive aggregate.

The aggregate may be used together with the cement in the proportions customarily employed in formulating mixes for various structural and insulation purposes, i.e. in "structural proportions." Thus, where the aggregate comprises sand, the sand and cement may be employed together in amounts varying over a wide range, e.g. from 2–8 parts of sand for each part of cement.

Where the aggregate is to be used in a concrete mix, any conventional design of aggregate may be employed.

As a special constituent imparting most valuable properties to the composition there may be included a pozzolan, used as a replacement for part of the cement component and included in an amount equal to from 0.1–75%, preferably 5–50% by weight, dry weight basis, of the cement component which otherwise would be employed. Examples of pozzolans which thus may be employed are "Celite" (a diatomaceous earth) and, particularly, Montcrey shale. A typical sample of the latter analyzes as follows:

[Percent by weight]

| | General | Specific |
|---|---|---|
| $SiO_2$ | 70–80 | 74.27 |
| $Al_2O_3$ | 8–12 | 10.08 |
| $Fe_2O_3$ | 2–4 | 3.14 |
| $CaO$ | 2–4 | 2.93 |
| $MgO$ | 0.5–2 | 0.86 |
| $K_2O$ | 0.5–2 | 1.16 |
| $Na_2O$ | 0.5–2 | 0.95 |
| $H_2O$ | Balance | Balance |

When included in the compositions of my invention, the pozzolans give them body, impart greater pourability and workability to them, improve their cohesive qualities, increase their strength after aging and, particularly, impart to them the ability to hang on vertical surfaces without sloughing off. The latter feature obviously is of the greatest importance when the compositions are applied to one of their major uses, i.e. as coatings on walls and ceilings.

The epoxy resins, which comprise another primary constituent of the herein described compositions, include broadly the thermosetting resinous materials, the molecular structure of which is characterized by the presence of reactive epoxy or ethoxyline groups serving as terminal linear polymerization points. Such resins result in general from the copolymerization of a monomer containing an epoxy group, or groups convertible to an epoxy group, with a monomer which is characterized by the presence of hydroxyl groups, such as a di- or poly-hydric phenol, or a di- or poly-hydric alcohol.

An example of a monomer furnishing the epoxy group is epichlorohydrin, and examples of monomers furnishing hydroxyl groups are the mononuclear di- and tri-hydroxy phenols including resorcional, hydroquinone, pyrocatechol, saligenine and phloroglucinol; glycerol; and the polynuclear and polyhydroxy phenols including Bisphenol A, Bisphenol F, trihydroxyl diphenyl and dimethyl methane 4,4'-dihydroxy biphenyl, the long-chain bisphenols.

One example of an epoxy resin particularly suitable for the present purposes is the thermosetting resinous condensation product of epichlorohydrin and Bisphenol A, the latter being the reaction product of phenol and acetone, dimethyl di-p-hydroxyphenyl methane $(CH_3)_2C(C_6H_4OH)_2$. Another example is the thermosetting resinous condensation product of epichlorohydrin and Bisphenol F di-p-hydroxy phenyl methane, $(CH_2(C_6H_4OH)_2$. Still another example is the thermosetting resinous condensation product of epichlorohydrin and glycerol.

Epoxy resins of the foregoing class are available from various commercial sources and in varying form, depending in part upon their degree of polymerization. All of them possess the characteristic of condensing when treated with catalytic materials or, more properly with curing agents of various categories.

Thus the curing agents in general may comprise the various aliphatic aromatic, primary, secondary, or tertiary amine curing agents have reactive hydrogen attached to amine groups thereof, specifically ethylene diamine, diethylenetriamine, triethylenetetramine, tetraethylene pentamine, diethylamino-propylamine, metaphenylenediamine, piperidine, diaminodiphenylsulfone, menthane diamine, and polyamide resins with which the epoxy resins may be cross linked.

Of particular interest as curing agents are the polyamide-type condensation polymers of dimerized and terimerized vegetable oil, unsaturated fatty acids, and aryl or alkyl polyamines. An example is the polyamide condensation polymer of polymeric fat acids and polyamines ("Versamid"). These products have molecular weights of up to 10,000 and melting points of up to 190° C. Other properties are as follows:

|  | Versamid | | | |
| --- | --- | --- | --- | --- |
|  | 100 | 115 | 125 | 140 |
| Amine value | 88 | 216 | 306 | 377 |
| Viscosity (poises): | | | | |
| At 75° C | | | 35 | 8 | 5 |
| At 150° C | 10 | | | |
| Flash point (° C., ASTM D92) | 325 | 295 | 265 | 185 |

The curing agents are used in varying amounts depending upon the quantity required to accomplish the required degree of linking or cross linking and setting of the epoxy resin in a stimpulated setting time. It usually is desirable to use at least the stoichiometric amount of curing agents. When curing an epichlorohydrin-Bisphenol A resin with polyamide ("Versamid") the ratio of resin to polyamide should be from 1:1-2:1 parts by weight.

As has been indicated in the foregoing general formulation, from 0.1–300% of epoxy resin and coreactant are employed, based on the combined dry weights of the cement and aggregate. A preferred use of activated resin is from 0.1–100% by weight, based on the combined dry weight of cement and aggregate.

It is a particular feature of the invention that even very small amounts of activated epoxy resin, i.e. amounts of the order of 0.1% by weight, materially improve the properties of the cement composition. On the other hand, if more than 3 parts of activated epoxy resin are employed for each part of aggregate mixture, the properties of the resulting composition begin to approach those of an epoxy resin rather than those of a structural cement. In addition, the cost becomes prohibitive for the structural applications contemplated herein.

The aqueous liquid, which is another important component of the present compositions, comprises water or water solutions of inorganic compounds or organic liquids such as the lower alcohols or ketones. It serves three important functions. First, it hydrates the inorganic cement, liberating heat and resulting in the setting of the cement and curing of the resin. Secondly, it assists in the dispersion of the resin throughout the finished composition. Third, it lubricates the mixture and imparts to it the required degree of workability, plasticity, coherence and resistance to segregation. The latter functions require more water than will combine chemically with the cement. Thus the amount employed may be characterized as being a quantity sufficient to hydrate the cement, lubricate the composition, and disperse the epoxy resin.

In a typical composition, the hydrating water is the amount defined by the Portland Cement Association as being the amount required to hydrate fully the particular cement employed. In addition, there must be used an amount of supplemental water for dispersing the resin and lubricating the mix. The total amount of water contained in a typical mix thus will run from 3–12 gallons per 100 pounds of cement.

Although the aqueous liquid may disperse the resin by first dissolving it and then serving as a medium for conveying it throughout the structure of the composition, it normally serves this function by emulsifying the resin. Accordingly, it usually is desirable to include in the resin-curing agent system an effective proportion of a suitable emulsifying agent. A wide variety of the conventional emulsifying agents may be employed for this purpose, using them as required to produce an emulsion of the desired properties.

As a special dispersing agent, the use of which is attended by other important advantages, there may be included in the herein described inorganic cement-epoxy resin compositions a substantial proportion of proteinaceous glue or gelatin. As used herein, the term "proteinaceous glue or gelatin" is intended to comprehend the various organic protein colloids, particularly those derived from animal sources, such as hide, blood, bone and fish glues and gelatins.

These may be included in amounts of from 0.1–20%, preferably from 0.5–5% by weight, based on the weight of the dry cement. If less than 0.1% of proteinaceous glue is used, its effect is too small to be significant. If more than 20% is employed, its use is uneconomical. In addition, it decreases the initial set of the composition and leads to the formation of products of decreased strength.

The glue may be added at any one of several stages during the preparation of the compositions. Thus it may be added to advantage during the grinding of the cement clinker where the grinding operation disperses it uniformly throughout the cement. In the alternative, however, it may be mixed with the aggregate or stirred into the curing agent before these materials are compounded with the other constituents of the composition.

When incorporated in the compositions, the glue serves as a valuable air entraining agent, reinforcing the air entraining properties of the epoxy resin. This is of importance in the preparation of compositions having a high air content, for example, up to 60% by volume of air in the form of small individual bubbles.

In addition, the glue makes the compositions flow better and imparts to them superior tensile and compressive strength. This is believed due to the creation by the epoxy resin and glue of a physical shell surrounding each individual air bubble, thus leading to the production of a stronger article than is produced when the product contains merely the voids which are characteristic of an air blown conventional concrete mix.

Compositions of particular value have been found to result when the polyamide curing agent described above, is used in conjunction with the glue or other proteinaceous colloid. When thus used, it serves two functions. First, it serves its normal function of curing the epoxy resin. Second, it serves as a dispersing and stabilizing agent, reinforcing the action of the glue in this respect and forming emulsions of particular stability.

In addition, the joint use of the polyamide curing agent and glue surprisingly makes it possible to use in the compositions much more water, i.e. up to 10 times as much water, than otherwise would be possible without causing breaking of the emulsion or affecting adversely the properties of the cured product. In fact, the properties of both the uncured and cured compositions are substantially improved because of the formation, and presence, of a multitude of small bubbles uniformly dispersed throughout the compositions.

Thus a typical specific formulation of the herein described composition is the following:

| | Parts by weight |
| --- | --- |
| Uncured Portland cement | 1 |
| Concrete aggregate | 1 to 8 |
| Thermosetting resinous condensation product of epichlorohydrin and Bisphenol A, and curing agent therefor | .002 to 27 |
| Water | .25 to 1 |

A typical specific composition containing pozzolan as a component is the following:

| | Parts by weight |
| --- | --- |
| Uncured Portland cement | 1 |
| Pozzolan | .05 to 1 |

| | Parts by weight |
|---|---|
| Concrete aggregate | 1 to 8 |
| Thermosetting resinous condensation product of epichlorohydrin and Bisphenol A, and curing agent therefor | .002 to 27 |
| Water | .25 to 1 |

A typical formulation of the invention in which glue is a component is as follows:

| | Parts by weight |
|---|---|
| Uncured Portland cement | 1 |
| Concrete aggregate | 1 to 8 |
| Thermosetting resinous condensation product of epichlorohydrin and Bisphenol A, and curing agent therefor | .002 to 27 |
| Animal glue or gelatin | .001 to .200 |
| Water | .25 to 1 |

Although various mixing procedures may be employed in formulating the compositions of the invention, a generally suitable mixing procedure is as follows: First, the emulsifying agent is mixed with the curing agent or with the epoxy resin. The curing agent, with or without the emulsifying agent, then is mixed with the epoxy resin until the mixture starts to warm up. This may require from 1–10 minutes. The emulsifying water next is added, whereupon the interaction between the resin and curing agent is inhibited. The mixing is continued at a rapid rate until an emulsion is formed which contains the air in the form of uniform fine bubbles.

The resulting activated mixture of epoxy resin, water, curing agent, and emulsifying agent then is added to the concrete mixture comprising cement, aggregate and additional water used in amount sufficient to lubricate the mix and hydrate the cement. This mixture may be mixed in conventional concrete or mortar mixers at the job site or in conventional concrete truck mixers.

As soon as the resin emulsion has been mixed thoroughly with the cement mixture, the resulting aerated composition may be applied by the selected technique. Thus it may be applied by pouring it into forms, or in mass concrete. It also may be used to manufacture concrete pipe by spinning, pouring or spraying concrete, or by spinning or spraying mortar.

Still further, it may be applied as a lining or coating for metal pipe by spinning, pouring, or spraying a concrete type mix on the interior or exterior of the pipe, or by spinning or spraying a mortar type mix on the interior and/or spraying a mortar type coating on the exterior of the pipe.

In the pumping and spraying of pre-mix concrete and mortar prepared either by the wet method or by the dry mix Gunite method, the mixtures can be injected at the nozzle instead of, or with, the mixing water.

The compositions still further may be applied in the fabrication of concrete wood or steel piling using a poured, in-form method, a gunning application, or a spraying procedure based on either a pre-mix wet method or a dry-mix Gunite method.

They also may be applied to the resurfacing of steel, wooden, or concrete pilings by gunning or spraying pre-mix wet mixtures or dry-mix Gunite mixtures.

Specific applications include their use as coatings by means of conventional grout pumps, mortar pumps, plaster pumps, and concrete pumps, as well as with Gunite dry mix guns in fire proofing surfaces of wood, plywood, or steel. They also may be employed in coating industrial vessels, concrete dams and flumes, concrete piles and pipes, metal pipes, floors and walls, railroad car interiors, building exteriors, air strip surfaces, and aircraft carrier or other ship decks. They also are well suited for coating tanks and vessels to be used for storing chemicals, which otherwise are subject to severe corrosion.

The coating may be applied to a depth commensurate with the contemplated end use. This may range for example from a fraction of an inch up to as much as 12 or 18 inches. Because of its stability, a surprisingly thin coating generally may be employed, with resulting weight reduction and economy of application.

Upon application, the constituents of the composition coact in the manner described above to result in its setting at a controlled, uniform rate. Thus the exothermic hydration of the inorganic cement provides a slow liberation of heat which promotes the setting of the epoxy resin. The water content of the composition, however, slows down the setting rate of the resin to a level at which it takes place uniformly, permitting application of the coating over a conveniently long period of time and to the requisite thickness. Also, the pot life of the spray mixture is extended to a value of several hours, further facilitating its application. As a result, uniform coatings and castings of great strength and cohesion are developed, as indicated in the following examples:

EXAMPLE 1

One hundred lbs. cement was mixed with four hundred lbs. sand and 3½ gallons of water. One gallon of epoxy resin mixed with the setting amount of polyamine catalyst was mixed with one gallon of water in an aerating mixer until a stiff emulsion was formed. It then was mixed thoroughly with the cement mixture in a mortar mixer.

The resulting composition was applied to wood, metal and concrete bases in coatings one-half inch thick, to which it firmly adhered. It also was cast in conventional concrete test cylinders.

The cylinders were steam cured for 1 day at 90° C. and then subjected dry to the commercial concrete cylinder compressive test.

The same procedure was repeated, but using a sand-cement ratio of 8 parts of sand for each part of concrete, the other constituents of the mixture being employed in the same amounts.

The results are given below.

*Sample #1*

4–1 sand-cement ratio, steam cured:

| | |
|---|---|
| Wt. before steam curing, grams | 427 |
| Wt. after steam curing, grams | 432 |
| Wt. dry | 396 |
| Compressive strength, p.s.i. | 1820 |

*Sample #1a*

4–1 sand-cement ratio, air cured:

| | |
|---|---|
| Wt. before curing, grams | 396 |
| Wt. dry after curing, grams | 371 |
| Compressive strength, p.s.i. | 850 |

*Sample #2*

8–1 sand cement ratio, steam cured:

| | |
|---|---|
| Wt. before steam curing, grams | 399 |
| Wt. after steam curing, grams | 411 |
| Wt. dry | 374 |
| Compressive strength, p.s.i. | 1660 |

*Sample #2a*

8–1 sand-cement ratio, air cured:

| | |
|---|---|
| Wt. before curing, grams | 427 |
| Wt. dry | 399 |
| Compressive strength, p.s.i. | 580 |

These values are to be compared with compressive strength values of but 600–900 p.s.i. for fully cured (28-day) control samples of aerated 4–1 concrete.

Also, a pronounced degree of elasticity was observed in breaking the cement-epoxy resin cylinders. This was not observed in the case of the cement test cylinders.

EXAMPLE 2

A second cement-epoxy resin spray coating composition was prepared from a dry tamp mortar mix and an epoxy resin mix having the following formulations.

Mortar mix: Parts by weight
- Sand _____ 3
- Cement _____ 1
- Protein glue (Consol D") _____ 0.01
- Water _____ 0.31

Epoxy resin mix:
- Epoxy resin (Epon 828) _____ 30
- Catalyst (Versamid) _____ 20
- Water _____ 20
- Ethyl alcohol _____ 10

The cement, sand and protein glue were mixed in a mortar mixer with sufficient water to form a dry tamp mix. The epoxy resin, catalyst, water and alcohol were thoroughly mixed independently of the mortar mix. The two basic formulations then were combined in the ratio of 4 parts by weight of mortar mix for each part by weight epoxy resin mix.

The resulting emulsified mixture was found to be easily pumpable and sprayable and remained so over long operating periods. When sprayed, it formed tough, adherent, durable coatings on the base materials.

EXAMPLE 3

This example illustrates the application of gypsum in the formation of the herein described compositions.

The formula employed was as follows.

Mix A: Lbs.
- Calcined gypsum (Keen cement) _____ 100
- Sand, 30 mesh _____ 100
- Sand, 60 mesh _____ 50
- Sand, 80 mesh _____ 50
- Water _____ 40

Mix B:
- Epoxy resin (epichlorohydrin Bisphenol A) __ 12
- Polyamide curing agent ("Versamid") _____ 8
- Water _____ 20

First, the components of mix A were thoroughly combined in a small mortar type mixer.

Then the constituents of mix B were emulsified.

The two preparations then were thoroughly blended together and sprayed on glass, plaster board and metal sheets and allowed to harden. In each case the composition cured to a uniform, coherent, hard coating, firmly bonded to the underlayment.

EXAMPLE 4

This example illustrates the application of a high alkali Portland cement in the herein described compositions.

The Portland cement employed had a content of sodium and potassium alkaline salts of 1.4% by weight, calculated as $Na_2O$. This was incorporated in the following formulation:

|  | Parts by Weight | |
|---|---|---|
|  | Test Composition | Control |
| Cement | 1,820 | 1,820 |
| Ground pyrex glass aggregate | 5,450 | 5,450 |
| Mix A: |  |  |
|   Water | 1,000 | 1,500 |
|   Proteinaceous glue | 18 |  |
|   Polyamide curing agent ("Versamid") | 44 |  |
| Mix B: |  |  |
|   Epoxy resin (epichlorohydrin Bisphenol A) | 73 |  |
|   Polyamide curing agent ("Versamid") | 44 |  |

First the cement and ground glass aggregate were mixed thoroughly in a mortar mixer. Mix A then was prepared by dissolving the glue in the warm water, adding the curing agent and stirring.

Mix B was prepared by thoroughly mixing together the epoxy resin and curing agent.

Mixes A and B were added to the blended cement-aggregate mixture and the resultant product thoroughly agitated. It then was cast into bars, which were cured for 24 hours.

A control mix having the indicated formulation also was prepared. The components of the control were thoroughly blended together and the resulting mixture cast into bars which also were cured for 24 hours.

Both samples then were tested according to the conventional activated aggregate test, ASTM specification C227–58T. In carrying out this test, the length of the bar was measured after curing for one day and again after curing for 14 days, and the increase in length noted. In the case of the composition of the invention, the increase was 0.00911 in./in. In the case of the control, the increase was 0.01675 in./in., 84% more than in the case of the composition of the invention.

EXAMPLE 5

This example illustrates the beneficial effect of the inclusion of pozzolan in the herein described compositions.

The procedure of Example 4 was repeated, with the exception that 454 grams (25%) of pozzolan was included in the mix.

The resulting mix was cast into bars which then were subjected to the activated aggregate test described above. In this case, the expansion of the test bars was but 0.00765 in./in. As compared with the control of Example 4, there thus was noted a 100% increase in the expansion of the control sample (without epoxy resin and pozzolan) over the test sample (with epoxy resin and pozzolan).

EXAMPLE 6

This example illustrates the application of an epichlorohydrin-glycerol epoxy resin in the formulation of the herein described compositions.

The following formulation was employed:

Pounds
- Epoxy resin (epichlorohydrin-glycerol) and polyamide curing agent ("Versamid") _____ 9
- Cement _____ 9
- Sand aggregate _____ 29
- Pozzolan _____ 1

The foregoing materials were blended together and the resulting mixture cast into forms and sprayed onto vertical structural surfaces. In each case the cured product was observed to be uniform, tough, chemically resistant and, in the case of the sprayed applications, firmly bonded to the underlayment.

EXAMPLE 7

This example illustrates the herein described compositions which include a proportion of proteinaceous glue, pozzolan and epoxy resin used in very small proportions.

The following mortar mix formulation was employed:

Pounds
- Epoxy resin (epichlorohydrin-Bisphenol A) and curing agent ("Versamid") _____ 9
- Cement _____ 9
- Sand aggregate _____ 29
- Pozzolan _____ 1

The cement contained 72% type 1 "high alkali" clinker, 3% gypsum, 24% pozzolan and 1% hide glue, all ground together.

First the pozzolan was blended with the epoxy resin in a plaster type mixer. Next the pozzolan-epoxy resin blend was mixed with the curing agent, the curing agent being used in the amount of slightly more than ⅓ the weight of the epoxy resin.

Next, 4½ pounds of water was blended into the resinpozzolan-curing agent system. Sufficient water was added to the dry cement-aggregate system to make it workable and to hydrate the cement. The two systems then were blended together in a plaster mixer.

The foregoing procedure was repeated two more times, blending together the ingredients as required to form a total of three compositions having respective ratios, epoxy resin: cement, of 1–1, 2–1 and 4–1.

These three compositions were applied as linings to standard concrete pipe which then was cut into arcuate sections the ends of which were dammed to create reservoirs into which 10% sulfuric acid was poured. An unlined test section was used as a control. At the end of five weeks the samples were observed for corrosion. The control sample was badly flaked and corroded. The specimens lined with epoxy-cement were relatively unaffected, except in localized areas where defects in the coating permitted access of the sulfuric acid to the underlying conventional concrete base.

The three samples of epoxy-cement were tested for bonding to various surfaces. For this purpose they were sprayed onto a dry concrete base block, a wet concrete base block and a steel plate. A conventional mixture of 3 parts of sand to 1 of Portland cement was sprayed on the same three base materials to provide a basis for comparison.

After the samples had cured, the test patches were sheared off by means of a standard Tinius-Olsen testing machine, the loading speed of the machine being .05 inch per minute. In each case the load at failure in pounds was divided by the test patch area, giving an average bond strength in p.s.i. The results are given in the table below:

| Mixture of Epoxy-concrete test specimen (Patch) | Bonded to— | P.s.i. at failure | | | Avg. |
| --- | --- | --- | --- | --- | --- |
| 1:1 | Concrete—dry | 155 | 192 | 202 | 186 |
| | Concrete—wet | 203 | 163 | 159 | 175 |
| | Steel plate—sandblasted | 159 | 164 | | 162 |
| 2:1 | Concrete—dry | 114 | 115 | 98 | 109 |
| | Concrete—wet | 88 | 98 | 104 | 97 |
| | Steel plate—sandblasted | 61 | 73 | | 67 |
| 4:1 | Concrete—dry | 58 | 79 | 65 | 67 |
| | Concrete—wet | 47 | 41 | 40 | 43 |
| | Steel plate—sandblasted | 30 | 28 | 16 | 25 |
| Concrete Mortar Comparison. | Concrete—dry | 23 | 28 | 20 | 24 |
| | Concrete—wet | 13 | 8 | 8 | 10 |
| | Steel plate—sandblasted | 0.1 | | | |

Next the three samples, and the control sample, were tested for compressive strength. After a cure period of 120 days using the standard ASTM compression test, the compressive strengths of the samples were found to be as follows.

Mixture: Compressive strength, p.s.i.
   1:1 epoxy-cement _____ 2504
   2:1 epoxy-cement _____ 2503
   4:1 epoxy-cement _____ 2632
   Conventional mortar _____ 1886

During the foregoing procedures, visual observation was made of the samples to determine their shrinkage. Shrinkage was observed for the conventional concrete control. No visible shrinkage occurred for any of the epoxy-cement samples.

EXAMPLE 8

This example illustrates a formulation of the invention especially useful as a cement mix, and its application to the production of spun concrete pipe.

The formulation employed was as follows.

Mix A: Pounds
   Portland cement containing 20% by weight pozzolan _____ 564
   Sand _____ 1133

Mix A—Continued Pounds
   Gravel _____ 1950
   Water _____ 277

Mix B:
   Epoxy resin (epichlorohydrin-Bisphenol A) __ 176.8
   Polyamide curing agent _____ 91.2
   Water _____ 192

Mix A was prepared in a conventional concrete mixer.

Mix B was prepared in emulsion form and mixed with mix A in the mixer.

The resulting composition then was spun into an epoxy-concrete pipe, which was cured in a steam chamber for 24 hours and put out to dry. After three days core samples were taken which were subjected to the ASTM compression strength test. The average compressive strength value of the sample was in excess of 5000 pounds per square inch. In addition, the pipe was characterized by the same acid resistance as were the pipe samples of Example 7, prepared from a coating or mortar mix formulation.

Thus it will be apparent that by the present invention I have provided a cement-epoxy composition which is of great strength, which is uniform, and which may be applied to a great variety of services in a diversity of commercial installations. Since it may be applied in emulsion form it is self-lubricating and flows readily through the hoses and guns with which it is applied, without abrasive action.

After application, it can be troweled to give a smooth surface. Because of its strength, it may be used in relatively thin coatings, thereby saving substantially in cost. Because of its unusual adherence to base materials, it becomes unnecessary to wrap the latter with wire or concrete reinforcing material thereby making additional savings in cost. In addition, its service life is of great duration, since it is resistant to chemicals, solvents, oil and grease, atmospheric agents, and sea water.

This application is a continuation-in-part of the patent application of James Howard Donnelly, Serial No. 817,477, filed June 2, 1959, for Cement-Epoxy Spray Coating Compositions.

Having thus described my invention in preferred embodiments, I claim as new and desire to protect by Letters Patent:

1. An inorganic cement-epoxy resin composition comprising:
   (a) uncured inorganic cement
   (b) cement aggregate
   (c) from 0.1–300%, based on the combined dry weight of the cement and aggregate, of a thermosetting epoxy resin and an amine curing agent having reactive hydrogens attached to amine groups thereof, the epoxy resin comprising the condensation product of epichlorohydrin and an hydroxyl-containing compound of the group consisting of glycerol and the polyhydric phenols and containing a plurality of vicinal epoxy groups, and
   (d) from 0.1–20%, based on the weight of the cement, of animal glue.

2. The cement-epoxy resin composition of claim 1 wherein the epoxy resin is a resinous condensation product of epichlorohydrin and glycerol.

3. The cement-epoxy resin composition of claim 1 wherein the epoxy resin is a resinous condensation product of epichlorohydrin and dimethyl-di-p-hydroxy phenyl methane.

4. The cement-epoxy resin composition of claim 1, wherein the uncured inorganic cement comprises an uncured Portland cement.

5. The cement-epoxy resin composition of claim 1 wherein the uncured inorganic cement comprises an uncured gypsum cement.

6. The cement-epoxy resin composition of claim 1 wherein the epoxy resin is used in amount from 0.1–100%, based on the combined weight of the cement and aggregate.

7. The cement-epoxy resin composition of claim 1 wherein the uncured inorganic cement is a high alkali cement having an alkali content of from 0.6 to 2.5% by weight, expressed a $Na_2O$.

8. The inorganic cement-epoxy resin composition comprising:

| | Parts by weight |
|---|---|
| Uncured Portland cement | 1 |
| Concrete aggregate | 1 to 8 |
| Thermosetting resinous condensation product of epichlorohydrin and dimethyl-di-p-hydroxylphenyl methane and curing agent therefor | .002 to 27 |
| Animal glue | .001 to .200 |

References Cited by the Examiner

UNITED STATES PATENTS

| 2,307,696 | 1/43 | McGuffie | 106—91 |
| 2,882,250 | 4/59 | Baker | 260—6 |
| 2,872,428 | 2/59 | Schroeder | 260—29.2 |
| 2,941,455 | 6/60 | Nagin. | |

OTHER REFERENCES

Renfrew et al.: Industrial and Engineering Chemistry, vol. 46, No. 10, October 1954, pp. 2226–32.

Leo et al.: Chemistry of Cement and Concrete, 1935, Edward Arnold & Co., London, pp. 14–17.

WILLIAM H. SHORT, *Primary Examiner.*

ALPHONSO D. SULLIVAN, JAMES A. SEIDLECK, *Examiners.*